United States Patent [19]
Pollack et al.

[11] Patent Number: 6,161,834
[45] Date of Patent: Dec. 19, 2000

[54] PRESSURE ENERGIZED SEAL

[75] Inventors: Jack Pollack, Calabasas Hills, Calif.;
Robert M Hobson,
Roquebrue-Cap-Martin, France

[73] Assignee: Imadco, Inc.

[21] Appl. No.: 08/905,060

[22] Filed: Aug. 1, 1997

[51] Int. Cl.[7] .................................................. F16J 15/40
[52] U.S. Cl. ...................... 277/300; 277/553; 277/589;
277/560; 277/579
[58] Field of Search .................................... 277/558, 563,
277/553, 589, 583, 560, 579, 554

[56] References Cited

U.S. PATENT DOCUMENTS

| | | | |
|---|---|---|---|
| 1,633,121 | 6/1927 | Minton ................................... | 277/419 |
| 2,186,139 | 1/1940 | Hild . | |
| 2,731,282 | 1/1956 | McManus et al. ...................... | 277/558 |
| 3,046,026 | 7/1962 | Burrows . | |
| 3,055,670 | 9/1962 | Sampson . | |
| 3,121,570 | 2/1964 | Gilbert . | |
| 3,144,256 | 8/1964 | Wright ................................... | 277/560 |
| 3,149,848 | 9/1964 | Galloway ............................... | 277/589 |
| 3,719,374 | 3/1973 | Serrano . | |
| 3,825,271 | 7/1974 | Bellastio ................................ | 277/558 |
| 3,854,694 | 12/1974 | Coone . | |
| 4,268,331 | 5/1981 | Stevens . | |
| 4,300,775 | 11/1981 | Ringel . | |
| 4,448,425 | 5/1984 | Von Bergen ........................... | 277/563 |
| 4,534,569 | 8/1985 | Ishitani et al. ......................... | 277/563 |
| 4,647,076 | 3/1987 | Pollack et al. ......................... | 285/95 |
| 4,669,758 | 6/1987 | Feller . | |
| 4,749,201 | 6/1988 | Hunger ................................... | 277/589 |
| 5,163,692 | 11/1992 | Schofield ............................... | 277/554 |
| 5,411,298 | 5/1995 | Pollack ................................... | 285/94 |
| 5,429,374 | 7/1995 | Eichenberger ......................... | 277/558 |

FOREIGN PATENT DOCUMENTS

| | | | |
|---|---|---|---|
| 000125896A | 11/1984 | European Pat. Off. ............... | 277/583 |
| 002535812A | 5/1984 | France ................................... | 277/579 |
| 002437138A1 | 2/1976 | Germany ............................... | 277/583 |
| 002753336A1 | 5/1979 | Germany ............................... | 277/583 |
| 003600691A1 | 7/1987 | Germany ............................... | 277/583 |

*Primary Examiner*—Anthony Knight
*Assistant Examiner*—Enoch E. Peavey
*Attorney, Agent, or Firm*—Leon D. Rosen

[57] ABSTRACT

A seal is provided for an offshore fluid swivel to seal a gap passage (34) leading from a transfer chamber (20) to the environment, which uses pressured fluid to apply a variable pressure that pushes the seal tightly against a sealed surface (52) on one side of the gap passage. In one arrangement, a ring-shaped seal device includes a seal body (82) of largely U-shaped cross-section, with a base (84) and a pair of legs (86, 88) extending from opposite sides of the base, with the base and at least one leg sealing against walls of the cavity that holds the seal. A hose (90) lies between the two legs and against the base of the seal body, and pressured fluid of greater than chamber fluid pressure is applied to the hose to expand it and thereby push apart the legs of the seal body. In another arrangement pressured fluid of greater than chamber pressure is used to push the entire seal body (152, 152D, 152E, 210) towards the sealed surface (52) and expand the body against upstream and downstream cavity walls (60, 70, 230, 232).

7 Claims, 3 Drawing Sheets

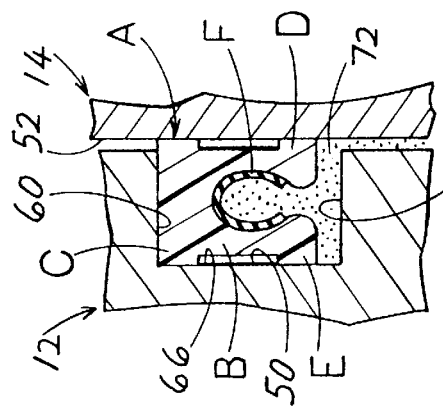
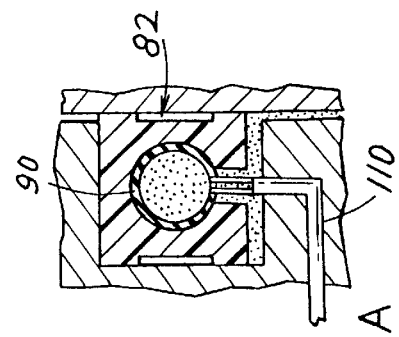
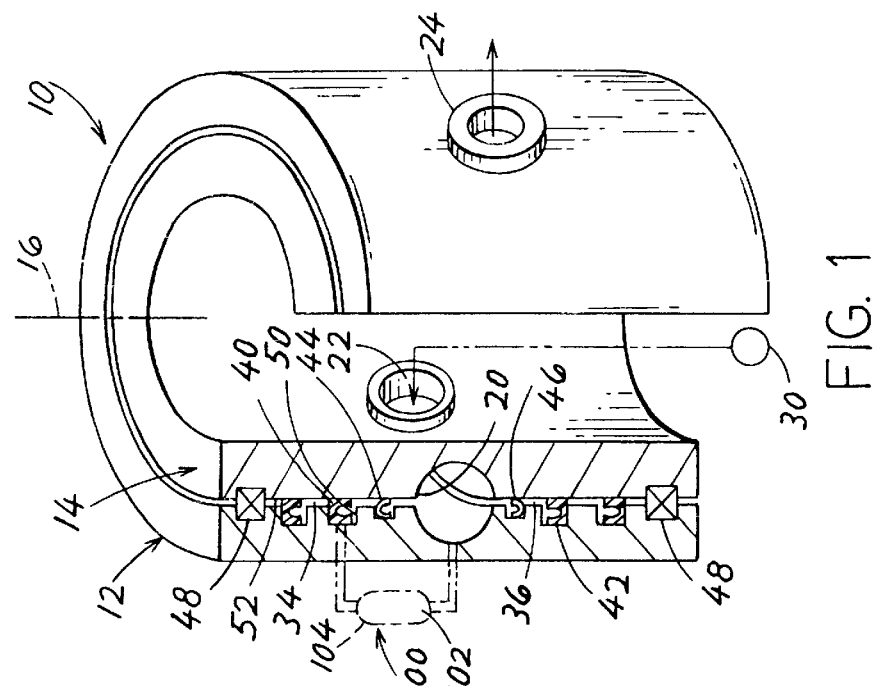
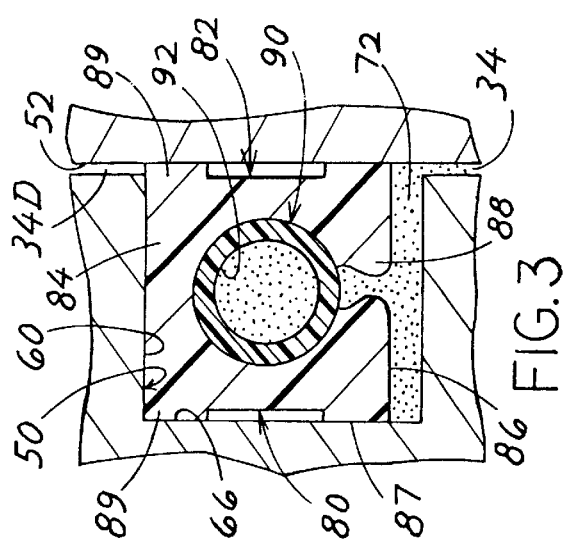
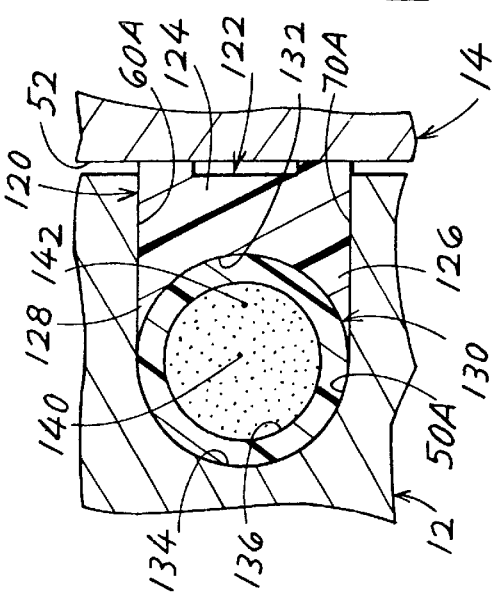
FIG. 2 PRIOR ART
FIG. 3A
FIG. 1
FIG. 3
FIG. 4

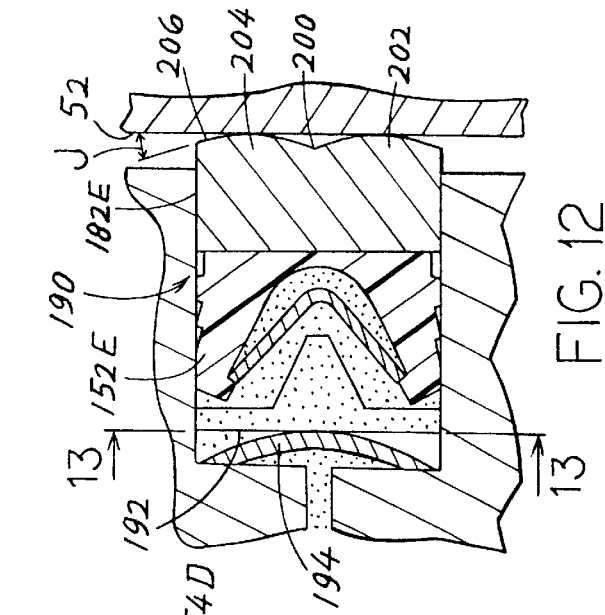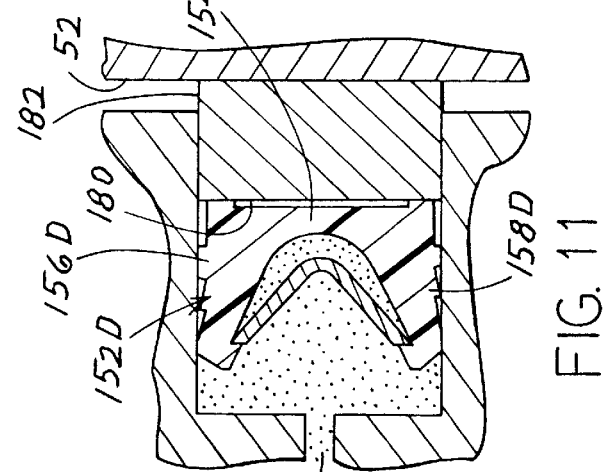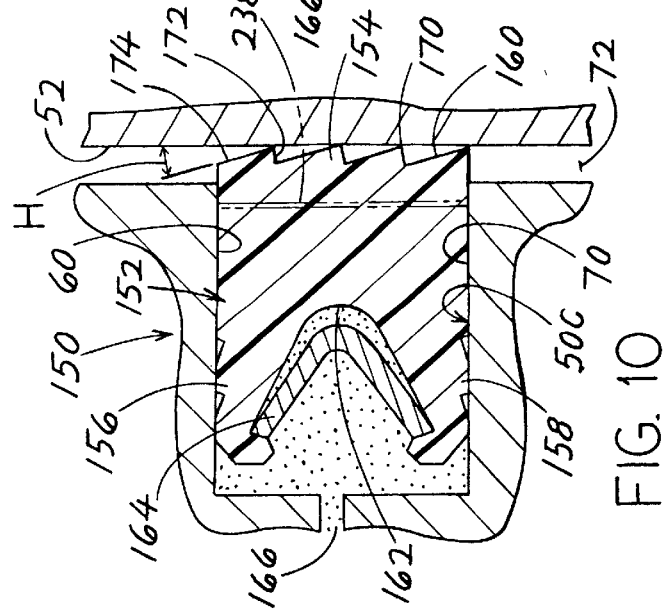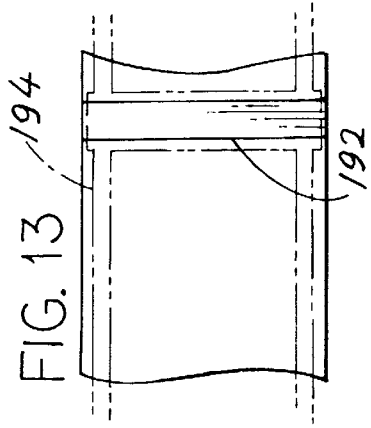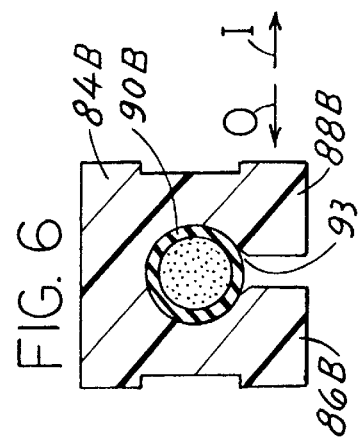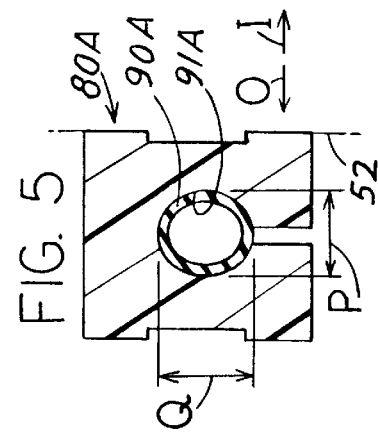

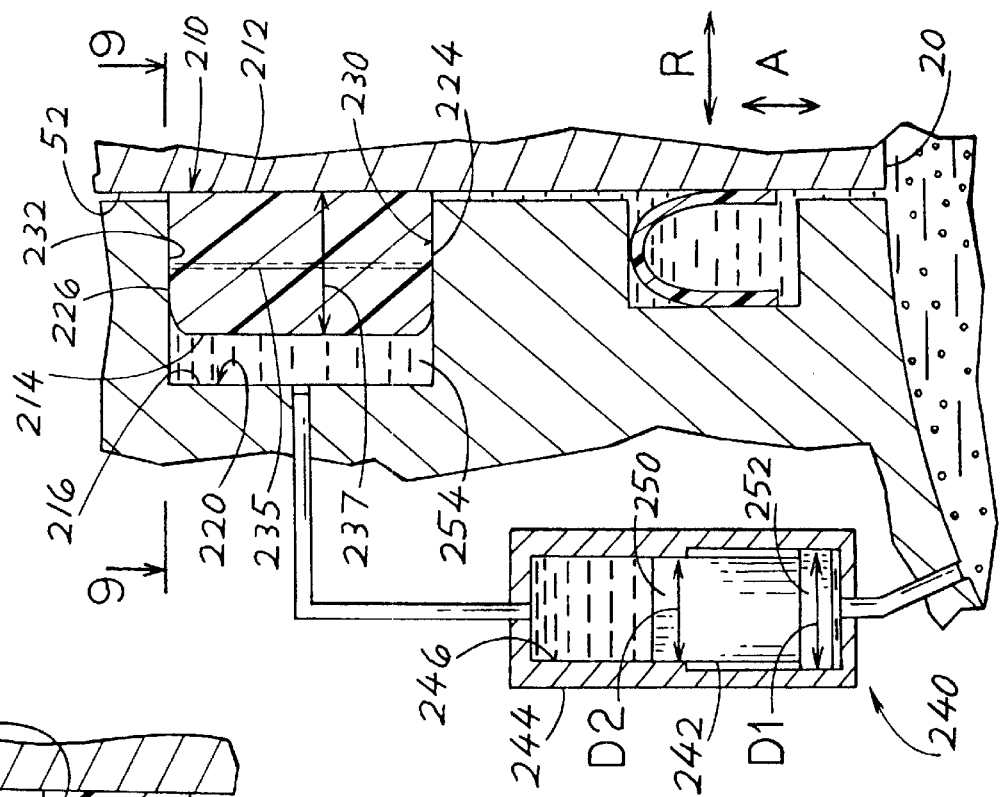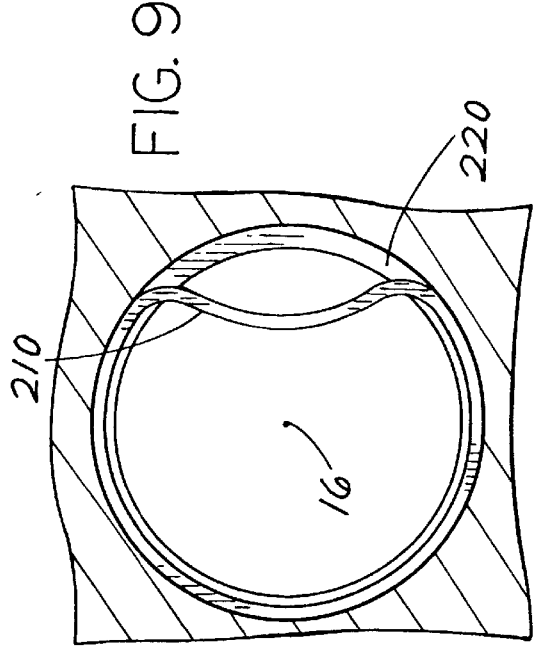

PRESSURE ENERGIZED SEAL

BACKGROUND OF THE INVENTION

Large, high pressure fluid swivels are commonly used in offshore hydrocarbon floating production systems. Such a fluid swivel commonly has a sealing surface diameter of about one to ten meters and carries fluid at a working pressure on the order of magnitude of a few hundred psi (a few hundred mega pascals). In such a system, fluids such as oil, natural gas, and water are transferred between an undersea well and a ship, the fluid swivel allowing the ship to weathervane. The fluid swivel includes inner and outer ring-shaped swivel parts rotating on one another, with a transfer chamber that is usually annular formed between them and with a pair of gap passages extending from the chamber to the environment. One or more seal devices lie along each gap passage, in a ring-shaped cavity, to prevent leakage of pressurized fluid.

The pressure of fluid passing through the fluid swivel may vary greatly. It would be desirable if the force with which the seal device pressed against the sealed surface that moves relative to the seal device, could be adjusted. This would result in the seal device wearing at a high rate only when high pressured fluid had to be sealed, to extend the life of the seal device and minimize friction under low pressure conditions while enabling sealing at high pressure.

SUMMARY OF THE INVENTION

In accordance with one embodiment of the present invention, improved seal devices are provided for large fluid swivels, which enables the sealing of high pressure while increasing seal life under low pressure conditions. In one embodiment of the invention, the seal device includes a sealed body of a largely U-shaped cross-section with a base and a pair of legs. A hose lies between the legs and against the base, and high pressure fluid is applied to the hose. The high pressure fluid expands the hose to push the legs apart to seal them against surfaces.

In another embodiment of the invention, a seal body has a dynamic surface pressed radially towards the sealed surface. Pressured fluid, of greater than transfer chamber pressure, is applied to the distal portion of the cavity to push the entire seal body radially toward the sealed surface and to simultaneously expand the axial dimension of the body to press it against upstream and downstream walls of the cavity. Either the body can press directly against the sealed surface, or a harder sealing ring can be used to avoid extrusion.

The novel features of the invention are set forth with particularity in the appended claims. The invention will be best understood from the following description when read in conjunction with the accompanying drawings.

BRIEF DESCRIPTION OF THE DRAWINGS

FIG. 1 is a partially sectional isometric view of a fluid swivel constructed in accordance with the present invention.

FIG. 2 is a sectional view of a prior art seal device shown in one of the cavities of the fluid swivel of FIG. 1.

FIG. 3 is a cross-sectional view of a seal device of one embodiment of the present invention, shown installed in a cavity of the fluid swivel of FIG. 1.

FIG. 3A is a sectional view of another location along the seal device of FIG. 3.

FIG. 4 is a sectional view of a second embodiment of the invention, shown installed in a cavity of the fluid swivel of FIG. 1.

FIG. 5 is a sectional view of a seal device of another embodiment of the invention, which is similar to that of FIG. 3 but with a modified hose.

FIG. 6 is a view similar to that of FIG. 5, but with the hose expanded.

FIG. 7 is a sectional view of a seal device of another embodiment of the invention, in one of the cavities of fluid swivel similar to that of FIG. 1, wherein the seal body seals against both upstream and downstream walls of the cavity.

FIG. 8 is a view of a portion of the seal body and a cavity wall of FIG. 7.

FIG. 9 is a view taken along line 9 and beyond of FIG. 7, showing the seal body during its installation but not showing the inner main swivel part.

FIG. 10 is a sectional view of a seal device constructed in accordance with another embodiment of the invention, shown installed in a cavity of the fluid swivel of FIG. 1.

FIG. 11 is a sectional view of a seal device constructed in accordance with another embodiment of the invention, shown installed in a cavity of the fluid swivel of FIG. 1.

FIG. 12 is a sectional view of a seal device constructed in accordance with another embodiment of the invention, shown installed in the fluid swivel of FIG. 1.

FIG. 13 is a view taken on line 13—13 of FIG. 12.

DESCRIPTION OF THE PREFERRED EMBODIMENTS

FIG. 1 illustrates a high pressure fluid swivel 10 of the present invention, which includes outer and inner main swivel parts 12, 14 that rotate relative to each other about an axis 16. Each of the main swivel parts forms about half of an annular transfer chamber 20. An inlet or port 22 on one of the parts such as the inner one may be connected to a hydrocarbon well and receives fluid, while the other part such as the outer one forms an outlet or port 24 through which the fluid passes out of the fluid swivel. Typically, the outer swivel part 12 is fixed to a ship to weathervane with it, while the inner part 14 is connected to a riser that extends up from the floor of the ocean to the ship. A source 30 of high pressure fluid such as an undersea well, supplies fluid to pass through the fluid swivel.

The fluid swivel forms a pair of gap passages 34, 36 extending from the transfer chamber 20 to the environment. The fluid swivel main parts have adjacent faces along the gap passages. At least one seal device 40, 42 lies along each gap passage to block the outflow of fluid. Often there are two similar seal devices along each gap passage. In addition, a low or zero pressure isolation seal 44, 46 lies along each gap passage. A pair of bearing assemblies 48 rotatably connect the swivel parts, although a single bearing can be used.

Each seal device such as 40 lies in a cavity 50 formed in one of the main parts such as 12, and seals against a dynamic (moveable) sealed surface 52 on the other main part. FIG. 2 shows a prior art seal device A lying in a cavity 50 of one main part and sealing against a sealed surface 52 of the other main part 14 of the fluid swivel. The particular seal device A includes a U-shaped seal body B that includes a base C that seals to a downstream wall 60 of the cavity and a pair of legs D, E. One of the legs D seals against the sealed surface 52 while the opposite leg E seals against a distal side 66 of the cavity (the side furthest from the sealed surface). The upstream side 70 of the cavity is subjected to the high pressure of fluid 72 in the transfer chamber of the fluid swivel. A spring F pushes the legs apart with a relatively low force, to assure that they will seal against their corresponding surfaces when the pressure rises from zero after installation. The force or pressure applied by the high pressure fluid 72 to the legs D, E to push them apart, depends upon the pressure of fluid in the transfer chamber. It is almost always desirable to apply a slightly higher (of at least a plurality of psi) pressure than that in the transfer chamber, to apply a higher force to the legs than that provided by the fluid 72, and to assure that the forces are properly applied.

FIG. 3 illustrates a seal device 80 of one embodiment of the invention, which includes a seal body 82 largely similar to that of the prior art, which is of U-shape and lies in a cavity 50 with four walls or sides 60, 66, 70 and 52. The seal body includes a base 84 that seals against a downstream wall 60 of the cavity, a pair of legs 86, 88 extending from opposite ends 85 of the base, with one leg 86 forming a distal surface 87 and sealing against the distal wall 66 and the other leg 88 forming a proximal surface 89 for sealing against the cylindrical sealed surface 52. However, instead of using a spring to push apart the legs 86, 88, applicant uses a hose 90. The hose has a substantially circular periphery to evenly apply expansion forces to the legs, and the inside walls of the base and legs 84-86 are largely circular to closely receive the hose. Pressured fluid is applied to the hollow inside 92 of the hose to expand it and push apart the legs 86, 88. The pressure of fluid 72 may be, for example, 1000 psi, while the hollow inside 92 of the hose may receive fluid of a pressure such as 1020 psi to provide a somewhat tighter seal against the sealed surface 52. Thus, the provision of a hose not only provides a means for initially "energizing" the seal to push the legs apart so as to assure that they press against the corresponding surfaces, but also enables a control of the force with which the legs press against corresponding surfaces 66, 52.

As indicated in FIG. 1, it is common to provide a container 100 with one side 102 directly connected to the transfer chamber 20 and the fluid therein, and with an opposite side 104 that contains a clear and clean fluid such as a low viscosity oil. The opposite side end 104 of the container may be connected to a portion of the gap passageway between the separation seal 44 and the high pressure seal device 40. Also, a similar container may be connected to a conduit 110 of FIG. 3A that leads to the hose 90 to pressurize it.

It should be noted that the seal device extends in a ring of substantially 360° (more than 340°) to seal a corresponding ring-shaped portion of the sealed surface. It is noted that while most sealed surfaces are portions of a cylinder, some sealed surfaces can lie in a plane. It is also noted that a ring of material harder than the material of the seal body 82 is sometimes placed between the proximal surface 89 of the body and the sealed surface 52. Such ring minimizes extrusion into the downstream end 34D of the gap passage, and is the equivalent of a portion of the seal body.

FIG. 4 illustrates a seal device 120 which lies in a cavity 50A of a different shape. The seal device includes a largely U-shaped seal body 122 with a base 124 and opposite legs 126, 128. A hose 130 lies between the legs and against a concave surface 132 that forms a distal side of the base 124 (the side furthest from the sealed surface 52). The concave surface 132 extends about 180°. The cavity 50A has a distal wall 134 which also extends by about 180°. The two concave walls 132, 134 are formed to merge and to closely hold the hose 130 between them. When the hollow inside 136 of the hose is pressurized, it pushes the legs 126, 128 against the upstream and downstream sides 70A, 60A to seal thereat. Perhaps of greater significance is the fact that the pressured hose pushes the base 124 towards the sealed surface to seal thereagainst. It is noted that the hose has an axis 140 that extends in a circle parallel to an axis 142 of the cavity 50A.

FIG. 5 shows a seal device 80A similar to that of FIG. 3, except that the hose 90A is initially of oval shape, at least at one side. The width P of the hose, in directions I, O that are normal to the sealed surface 52, is less (95% or less) than the height Q of the hose. The corresponding hose-engaging surface 91A of the legs and base may be initially configured to hold an oval hose. When the hose is pressurized, the legs move apart and a configuration similar to that of FIG. 6 is achieved. In FIG. 6, the hose at 90B has been expanded from an oval shape to a round one. There are gaps at 93 where an end of the oval has moved away from the legs. This arrangement provides a greater area of seal of the hose against the legs 86B, 88B after they have expanded under the force of the hose, with less hose distortion.

FIG. 7 illustrates a seal device 210 in the form of a seal body with four sides. A proximal side 212 seals directly against the cylindrical sealed surface 52 while a distal side 214 faces primarily away from the sealed surfaces and toward a distal wall 216 of the cavity 220. The upstream and downstream sides 224, 226 of the seal body lie in an interference fit with the corresponding walls 230, 232 of the cavity. Each axial side of the seal body has an initial shape, such as shown at 226A in FIG. 8 for side 226, with an interference of a plurality of thousandths inch, such as 0.004 inch at each end for a seal device having a height of 2 inches. It can be seen that the seal body 210 has imaginary strip-shaped regions 235 that extend between the upstream and downstream walls or surfaces 230, 232. The strip-shaped regions are perpendicular to the upstream surface 230 and are completely filled with plastic material. The total cross-sectional area occupied by such strip-shaped regions is more than half the radial length, between sides 212 and 214, of the body. In FIG. 7, the strip-shaped regions 235 occupy substantially the entire radial length 237 of the body. Similar strip-shaped regions 238 in FIG. 10 occupy more than half the radial length of the body.

The seal body 210 is a solid body of engineering plastic, having a yield strength on the order of magnitude of 15,000 psi, is initially pressed against the entrance 236 of the cavity, and then pressed into the cavity as by hammering it in with a mallet having a soft face. FIG. 9 shows the shape of the seal device as it is being installed in the ring-shaped cavity 220 that extends about the axis 16 of the fluid swivel.

FIG. 7 shows one example of a pressurizing device 240 which includes a piston 242 and cylinder 244 with opposite ends of different diameters. The small inside diameter end 246 of the cylinder contains a clean liquid. In one example, the difference in diameter D1 and D2 is 5% so the area of the small piston end 250 is about 90% that of the large end 252. The pressure of the clean fluid is about 110% of the pressure in the transfer chamber 20. Applicant finds that a pressure on the order of 10% greater than transfer chamber pressure and preferably between 5% and 20% above chamber pressure, in the distal portion 254 of the cavity reduces the diffusion of gas (from the chamber 20) to almost zero. The higher-than-chamber pressure in the cavity portion 254 axially expands the seal body 210 against cavity walls 230, 232 as it pushes the body proximal side 212 against the dynamic sealed surface 52. This is accomplished by the Poissan's ratio effect where radial compression (directions R) results in axial expansion. The Young's modulus of elasticity should be less than $0.5' \times 10^6$ psi (less than 35GPa) to obtain significant axial expansion (directions A).

FIG. 10 illustrates a seal device 150 that includes a seal body 152 of largely U-shape, with a base 154 and with legs 156, 158. The base 154 has a proximal side 160 that seals directly against the sealed surface 52, and has a distal side 162 that faces largely away from the sealed surface. A spring 164 is provided to initially "energize" the seal. A pressured fluid conduit 166 applies pressured fluid to the cavity 50C. The pressured fluid, which is preferably greater than the pressure of fluid 72 at the upstream side of the cavity along the gap passage, pushes the proximal side 160 of the base firmly against the sealed surface 52 to form a seal thereat. Also the pressured fluid presses the legs 156, 158 firmly against the downstream side 60 and the upstream 70 of the cavity to seal the legs thereagainst.

It may be noted that the proximal side 160 of the seal body 152 and of its base, includes a plurality of projections 170. Each projection (which extends in a ring around the axis of the fluid swivel) has an upstream side 172 that extends largely perpendicular or normal to the sealed surface 52. However, the downstream side 174 extends at a small angle H which is less than 30° and with the angle H shown being 12°. This angling of the downstream side 174 allows it to press with a progressively greater footprint against the sealed surface 52 as progressively greater force is applied to the sealed body. Thus, at low pressures, the distal side 162 of the sealed body provides a small footprint and correspondingly low friction, while at high pressure the distal side provides a larger footprint for better sealing even though this results in greater friction.

FIG. 11 illustrates a seal device 180 largely similar to that of FIG. 10, except that it includes a seal ring 182 of more rigid material than that of the seal body 152D. The operation of the seal device 180 is similar to that of FIG. 10, with a fluid pressure greater than that in the transfer chamber applied through conduit 166D pushing the legs 156D, 158D apart to seal against the cavity walls and to press the base 154D toward the sealed surface to push the harder seal ring 182 against the sealed surface.

FIG. 12 illustrates a seal device 190 which is largely similar to that of FIG. 11, with the device 190 including a seal body 152E and a seal ring 182E. The seal body 152E has walls 192 spaced around its circular length, and has a spring 194 that pushes against the wall 192 to thereby push the seal body 152E and seal ring 182E against the sealed surface 52. It is noted that the seal ring 182 is provided with a proximal surface 200 with a pair of projections 202, 204 having downstream sides 206 that are angled at a small angle J that is preferably less than 300 and with J being shown as about 17° in FIG. 12.

It can be seen that in FIGS. 10–12 the upstream and downstream sides 208, 209 of the seal device are sealed against the corresponding cavity walls along more than half the radial length (in directions 1, 0) of the upstream and downstream sides of the sealed device. Thus, in FIG. 10 the upstream side of the sealed device is sealed between locations 210, 212 to the wall 70, while the downstream side of the seal device is sealed between locations 214, 216 to the wall 60. The distance between locations such as 210 and 212 are more than half the radial length of the seal device at its upstream side (which is between locations 220 and 222).

Thus, the invention provides seal devices for fluid swivels, which enable better control of the force with which the seal device presses against surfaces to be sealed against. One set of seal devices includes a hose that is pressurized to push against surfaces of a seal body (which may have portions of different hardness). In another arrangement, axially opposite sides of a seal body are pressed against upstream and downstream walls of a cavity while the seal body is pressed towards the sealed surface by fluid, at a pressure greater than that in the transfer chamber, applied to the distal side of the cavity. The seal body may press directly against the sealed surface or a harder seal ring can be positioned between the seal body and sealed surface.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A fluid swivel that lies in an environment, where the swivel comprises inner and outer main parts that each have ports and comprising a bearing that supports said main parts in rotation of one of them with respect to the other about an axis, said main parts forming a transfer chamber between them through which a fluid flows between said ports and said main parts forming a gap passage between them leading from said transfer chamber to the environment with one of said main parts forming an annular cavity along said gap passage and with the other of said main parts forming a sealed surface that lies opposite said cavity along said gap passage, with said fluid swivel including an annular seal device lying in said cavity, said cavity having an upstream surface lying closest to said transfer chamber, an opposite downstream surface, and a distal surface lying furthest from said sealed surface, wherein:

said seal device includes a seal body having upstream, downstream, distal and proximal body sides, with said body upstream side exposed to a high pressure fluid, and with said seal body having a pair of legs forming said proximal and distal sides of said body;

said seal device also includes an annular hose lying between and against said leas and having a hollow inside; and including a conduit coupled to the inside of said hose to pressurize it to cause said hose to push firmly against said body, to expand said legs against opposite ones of said surfaces.

2. The fluid swivel described in claim 1 wherein:

said hose has an oval shape when unpressurized, with said oval shape having largest and smallest dimensions, and with the smallest dimension of the oval extending primarily parallel to a line that is normal to said sealed surface.

3. The fluid swivel described in claim 1 including:

means coupled to said conduit and to said transfer chamber, for applying fluid to said conduit at a pressure that is greater than the pressure of fluid in said transfer chamber.

4. A fluid swivel that lies in an environment, where the swivel comprises inner and outer main parts that each have ports and the swivel comprises a bearing that supports said main parts in rotation of one of them with respect to the other about an axis, said main parts forming a transfer chamber between them through which fluid flows between said ports and said main parts forming a gap passage between them leading from said transfer chamber to the environment with one of said main parts forming an annular cavity along said gap passage and with the other of said main parts forming a sealed surface that lies opposite said cavity along said gap passage, with said fluid swivel including an annular seal device lying in said cavity, said cavity having an upstream wall lying closest to said transfer chamber, an opposite downstream wall, and a distal wall lying furthest from said sealed surface, wherein:

said seal device includes a seal body having upstream, downstream, distal and proximal body sides, with said body upstream side exposed to a high pressure fluid and with said downstream and proximal body sides lying against said downstream wall and said sealed surface, respectively, to seal against said downstream wall and said sealed surface;

said seal device also includes an annular hose having a hollow inside, said hose having an outside lying against said seal body; and including a conduit coupled to the inside of said hose to pressurize it to cause said hose to push firmly against said body, to push said proximal side of said body against said sealed surface;

said cavity has an annular axis and said distal wall of said cavity forms a first concave surface that extends about 180°, as seen in a cross-sectional view, around an imaginary line that is parallel to said axis;

said seal body distal side has a second concave surface that faces said first concave surface of said cavity and that extends about 180°, as seen in a cross-sectional view, around said imaginary line;

said hose lies between and against said first and second concave surfaces to push against both of them.

5. A fluid swivel that lies in an environment, where the swivel comprises inner and outer main parts that each have ports and where the swivel comprises a bearing that supports said main parts in rotation of one of them with respect to the other about an axis, said main parts forming a transfer chamber between them through which a fluid flows between said ports and said main parts forming a gap passage between them leading from said transfer chamber to the environment with one of said main parts forming an annular cavity along said gap passage and with the other of said main parts forming a sealed surface that lies opposite said cavity along said gap passage, with said fluid swivel including an annular seal device lying in said cavity, said cavity having an upstream wall lying closest to said transfer chamber, an opposite downstream wall, and a distal wall lying furthest from said sealed surface, wherein:

said seal device includes a seal body having upstream, downstream, distal and proximal body sides, with said body upstream side exposed to a high pressure fluid and at least said downstream and proximal body sides lying against said downstream wall and said sealed surface, respectively, to seal thereagainst;

said seal device also includes an annular hose having a hollow inside, said hose having an outside lying against said seal body; and including a conduit coupled to the inside of said hose to pressurize it to cause said hose to push firmly against said body, to at least push said proximal side of said body against said sealed surface;

a fluid source coupled to said transfer chamber and to said conduit, to raise and lower the pressure of fluid in said conduit as the pressure of fluid in said transfer chamber respectively increases and decreases.

6. A fluid swivel which lies in an environment, comprising inner and outer main parts that each have ports and a bearing that supports said main parts only in rotation of one of them with respect to the other about an axis, said main parts forming a transfer chamber between them through which a pressurized fluid flows between said ports, and said main parts forming a gap passage between them leading from said transfer chamber to the environment with a first of said main parts forming an annular cavity along said gap passage and a second of said main parts forming a sealed surface that lies opposite said cavity along said gap passage, with said fluid swivel including an annular seal device lying in said cavity, said cavity being of generally rectangular cross-section and having an upstream surface lying closest to said transfer chamber, an opposite downstream surface, and a distal surface lying furthest from said sealed surface, wherein:

said seal device includes a seal with proximal and distal sides lying respectively against said sealed surface and furthest from said sealed surface, with said proximal side having a proximal surface and said distal side having a distal surface;

said seal having primarily radially extending upstream and downstream sides that are each of a predetermined radial length and that lie against and seal against said cavity upstream and downstream surfaces respectively, with said seal distal side facing largely toward said distal surface of said cavity;

means coupled to said cavity for applying pressured fluid to said distal surface of said cavity to apply a force to said seal that presses it toward said sealed surface;

said distal and proximal sides of said seal each being devoid of a deep recess that would result in a thinned seal portion and allow any portions of said upstream and downstream sides to move together by bending of any such thinned seal portion lying between said upstream and downstream sides, and said upstream and downstream sides of said seal are sealed respectively against said upstream and downstream surfaces along substantially their entire widths that lie opposite said upstream and downstream surfaces, by a Poisson's ratio effect where radial compression by said pressured fluid applied to said distal side results in a tendency to axial expansion of said seal.

7. A fluid swivel which lies in an environment, comprising inner and outer main parts that each have ports and a bearing that supports said main parts only in rotation of one of them with respect to the other about an axis, said main parts forming a transfer chamber between them through which a pressurized fluid flows between said ports, and said main parts forming a gap passage between them leading from said transfer chamber to the environment with a first of said main parts forming an annular cavity along said gap passage and a second of said main parts forming a sealed surface that lies opposite said cavity along said gap passage, with said fluid swivel including an annular seal device lying in said cavity, said cavity being of generally rectangular cross-section and having an upstream surface lying closest to said transfer chamber, an opposite downstream surface, and a distal surface lying furthest from said sealed surface, wherein:

said seal device includes a seal;

said seal having a proximal surface lying adjacent to said sealed surface and having primarily radially extending upstream and downstream sides that are each of a predetermined radial length and that lie against and seal against said upstream and downstream surfaces respectively, with said seal having a distal side facing largely toward said distal surface of said cavity;

means coupled to said cavity for applying pressured fluid to said distal surface of said cavity to apply a force to said seal that presses it toward said sealed surface;

said distal side of said seal being devoid of a deep recess that would divide said seal into separate lips that can bend to move apart, and said upstream and downstream sides of said seal are sealed respectively against said upstream and downstream surfaces along substantially their entire widths that lie opposite said upstream and downstream surfaces, by a Poisson's ratio effect where radial compression by said pressured fluid applied to said distal side results in a tendency to axial expansion of said seal;

said seal device includes a seal ring (182) of substantially rectangular cross-section that is formed by said seal and said seal device also includes a seal body, with said seal ring being of more rigid material than material of said seal body and extending across an entire length of said cavity between said upstream and downstream surfaces;

said seal body has a distal side that is exposed to said pressured fluid that is applied to said distal surface of said cavity, and said seal distal side has a recess forming a pair of legs that are pressed apart against said upstream and downstream surfaces of said cavity, and said seal body being pressed against said seal ring.

* * * * *